3,336,232
EMULSIONS CONTAINING TRICHLOROTRIFLUO-
ROETHANE FOR THE CLEANING OF APPA-
RATUS
Albert W. Bauer and Paul A. Sanders, Wilmington, Del.,
assignors to E. I. du Pont de Nemours and Company,
Wilmington, Del., a corporation of Delaware
No Drawing. Filed Dec. 12, 1963, Ser. No. 329,998
13 Claims. (Cl. 252—153)

This invention relates to a novel solvent composition and a process of cleaning. More particularly, this invention relates to a novel solvent composition comprising trichlorotrifluoroethane, isopropylammonium dodecylbenzenesulfonate, water and, optionally, ammonia and a process for cleaning machinery therewith.

It is the object of this invention to provide a new solvent composition. Another object is to provide a new solvent composition for cleaning machinery, particularly business machines. A further object is to provide a solvent formulation which will remove greases, oils, dried ink, water soluble corrosion products and stains from business machines without attacking plastics, rubber or the like. These and other objects will become apparent in the following description and claims.

More specifically the present invention is directed to a stable water-in-oil emulsion composition comprising from about 0.25% to about 50% by weight water, from about 0.1% to about 45% by weight isopropylammonium dodecylbenzenesulfonate and at least about 30% by weight 1,1,2-trichloro-1,2,2-trifluoroethane and to a process for cleaning machinery which comprises contacting the machinery with the stable water-in-oil emulsion.

The novel water-in-oil type emulsion of this invention consists of three essential ingredients, viz 1,1,2-trichloro-1,2,2-trifluoroethane, water and isopropylammonium dodecylbenzenesulfonate. One specific embodiment of the invention consists in the addition of ammonia to the abovedescribed ingredients. Trichlorotrifluoroethane and isopropylammonium dodecylbenzenesulfonate are miscible in all proportions, hence emulsions of trichlorotrifluoroethane, water and isopropylammonium dodecylbenzenesulfonate can be prepared in essentially all proportions. However, as the amount of water in the emulsion is increased, the emulsion changes from the water-in-oil type to the oil-in-water type. This inversion occurs when the emulsion contains approximately 55% by weight of water hence the upper limit of water used in the practice of this invention is about 50% by weight of water. Emulsions consisting of one part (16.7%) isopropylammonium dodecylbenzenesulfonate, two parts (33.3%) trichlorotrifluoroethane and three parts (50%) water are still the water-in-oil type. Due to the 50% upper limit on water, nothing is gained by using more than about 45% isopropylammonium dodecylbenzenesulfonate hence, for practical reasons, the upper limit of about 45% by weight is applied to this component. Although emulsions containing very small amounts of trichlorotrifluoroethane can be prepared, at least about 30% by weight is usually required to obtain water-in-oil type emulsions. The lower limit of about 30% by weight is therefore applied to this component.

In any particular system the amount of water which will enter the emulsion is determined by the amount of isopropylammonium dodecylbenzenesulfonate in the emulsion. A maximum of three to five parts water per part of the dodecylbenzenesulfonate salt in the emulsion can be attained. The data shown in Table I below are typical of the relationship between the concentrations of the salt and water.

TABLE I

| Parts isopropylammonium dodecylbenzenesulfonate per 100 parts 1,1,2-trichloro-1,2,2-trifluoroethane: | Parts water per 100 parts 1,1,2-trichloro-1,1,2-trifluoroethane solution |
|---|---|
| 0.25 | 1.4 |
| 0.50 | 1.7 |
| 1.0 | 3.6 |
| 2.0 | 6.7 |
| 4.0 | 13.2 |

In the presence of ammonia the amount of water which will enter the emulsion is decreased by about one-fifth. For this reason the upper limit on water in emulsions containing ammonia is about 40% by weight.

The lower limits of about 0.25% by weight water and about 0.1% by weight isopropylammonium dodecylbenzenesulfonate are based on practical considerations. Emulsions containing less than about 0.25% water do not possess the utility desired; at least 0.1% of the salt is required to obtain 0.25% water in the emulsions. For practical purposes, in ammonia free emulsions, more than about 10% by weight of the dodecylbenzenesulfonate salt and 10% by weight of water do not increase the efficiency for the intended use although such emulsions may be prepared for reasons described below. Similarly, emulsions containing ammonia are not increased in efficiency by adding more than about 4% by weight of ammonia.

The nature of the emulsifying agent is of primary importance. Isopropylammonium dodecylbenzenesulfonate can hold, as previously noted, up to 3 to 5 times its own weight of water when emulsified in 1,1,2-trichloro-1,2,2-trifluoroethane. Dodecylbenzenesulfonic acid or the alkali metal or ammonium salts thereof lack this ability, being five or more times less effective. Other amine salts of dodecylbenzenesulfonic acid fall in the same category as illustrated in Table II below.

TABLE II

| Amine salt of dodecylbenzenesulfonic acid*: | Parts water per 100 parts of 1% amine salt in 1,1,2-trichloro-1,2,2-trifluoroethane |
|---|---|
| Triethylamine | 0.05 |
| n-Propylamine | 0.59 |
| Isopropylamine | 3.6 |
| n-Butylamine | 0.24 |
| Isobutylamine | 0.21 |
| Tert-butylamine | 0.33 |
| Diethylamine | 0.27 |
| Diisopropylamine | 0.52 |
| Cyclohexylamine | 0.24 |
| 1,1,3,3-tetramethylbutylamine | 0.14 |

*All of the above salts were prepared from dodecylbenzenesulfonic acid taken from the same sample.

It is surprising that considerably more water can be incorporated into the emulsions of the present invention than emulsions prepared by substituting other common chlorinated hydrocarbon solvents for 1,1,2-trichloro-1,2,2-trifluoroethane. Some illustrative examples of this phenomenon are shown in Table III below.

TABLE III

| 1% solution of isopropylammonium dodecylbenzenesulfonate in: | Parts water per 100 parts of solution |
|---|---|
| $CF_2ClCFCl_2$ | 3.6 |
| $CCl_2=CCl_2$ | 0.2 |
| $CHCl=CCl_2$ | 0.04 |

Isopropylammonium dodecylbenzenesulfonate is a commercial product, "Emcol P10–59," which varies somewhat in its ability to emulsify water in trichlorotrifluoroethane. One reason for this variation appears to be the presence of sulfate salts in the product which are detrimental. These sulfates appear to result from the failure to free the dodecylbenzene sulfonic acid completely from sulfur trioxide during manufacture. Another cause of variation appears to reside in the dodecyl group. Dodecylbenzene, from which the sulfonic acid is derived, is obtained from a number of sources and the source of the compound seems to have an effect. Why this should be so is not understood at the present time. The presence of didodecylbenzenesulfonic acids or of disulfonic acids may also have an effect but these effects are also undetermined.

The water used in preparing the emulsions of this invention should be relatively free of chlorine and dissolved salts, particularly sodium chloride. More than minute trace quantities of sodium chloride cause water to separate from the emulsion. Ammonia, as noted above, also decreases the amount of water that can be emulsified.

The primary utility for the defined emulsions is cleaning machinery, particularly business machines such as typewriters, adding machines, desk calculators and the like. The emulsions remove both oil and water soluble soils and stains. These emulsions are also useful for cleaning pay telephones and particularly the coin operated mechanisms therein. The emulsions remove oils, greases, and other oily materials, dried ink and the like as well as the corrosion products of metals and other water soluble materials. The emulsions do not attack plastic and rubber parts in the electric motors, wires, platens and the like. Furthermore, they do not attack paints, lacquers and other surface coatings. Cleaning is carried out by contacting the machinery with the emulsion usually by immersing the machine in the emulsion. More rapid cleaning is obtained if agitation is supplied. A particularly useful and rapid form of cleaning involves the use of ultrasonic vibration. Ultrasonic cleaning devices are well known in the art. Cleaning is usually followed by a brief rinsing with trichlorotrifluoroethane. The cleaned machine usually dries in a few seconds after rinsing.

The emulsions of this invention are also useful for drying machinery parts including metallic, plastic and other parts without requiring physical drying techniques such as heating and the like. Emulsions which are well below their saturation point are particularly useful for this purpose. If only drying is desired, the metal or other part can be treated with a solution consisting of isopropylammonium dodecylbenzenesulfonate in 1,1,2-trichloro-1,2,2-trifluoroethane. The water on the surface of the metal combines with the solution to form an emulsion. A rinse with trichlorotrifluoroethane then leaves the surface essentially dry.

Only the use of 1,1,2-trichloro-1,2,2-trifluoroethane has been described here since the isomeric 1,1,1-trichloro-2,2,2-trifluoroethane has not been found to be particularly useful.

Some preferred embodiments of the emulsions of this invention are as follows: (1) 2% isopropylammonium dodecylbenzenesulfonate, 6% water and 92% 1,1,2-trichloro-1,2,2-trifluoroethane; (2) 1% isopropylammonium dodecylbenzenesulfonate, 0.75% water, 0.25% concentrated aqueous ammonia and 98% 1,1,2-trichloro-1,2,2-trifluoroethane; (3) 16.7% isopropylammonium dodecylbenzenesulfonate, 33.3% 1,1,2-trichloro-1,2,2-trifluoroethane and 50% water; (4) 2.5% isopropylammonium dodecylbenzenesulfonate, 6% water, 0.05% ammonia and the remainder 1,1,2-trichloro-1,2,2-trifluoroethane. All of the above percentages are by weight. Emulsions 1, 2 and 4 are particularly useful for cleaning operations. Emulsion 3 is used for shipping purposes; it is generally diluted with 1,1,2-trichloro-1,2,2-trifluoroethane before use in the cleaning process but can be used without dilution for cleaning operations if desired. Other preferred forms of this invention are shown in the examples below. Emulsions containing ammonia are particularly useful for removing certain surface stains from metals.

The emulsions of this invention are prepared by dissolving the isopropylammonium dodecylbenzenesulfonate in trichlorotrifluoroethane. Water is then added and the mixture is agitated until emulsification is complete. If emulsions containing ammonia are desired, the ammonia may be added either in the gaseous state or, preferably, in solution in the water to be added. Within the broad limits outlined above, either water or trichlorotrifluoroethane can be added to the emulsions thus prepared. The emulsions appear to be completely stable on storage.

During the cleaning process, water soluble salts dissolve in the aqueous phase of the emulsion causing a certain amount of water to separate out of the emulsion. The water which separates contains a majority of the dissolved salts and a minimum of surfactant. The separated water phase may be removed from the cleaning area and fresh water or aqueous ammonia added to bring the emulsion back up to strength. In this way the useful life of the emulsion for cleaning purposes is extended without requiring removal of the dissolved materials. The water added, like that used to prepare the emulsion originally, should be free of dissolved salts and chlorine.

Representative examples of the present invention are illustrated below. All parts are by weight unless stated otherwise.

*Example 1*

Two parts (16.7%) of isopropylammonium dodecylbenzenesulfonate were dissolved in four parts (33.3%) 1,1,2-trichloro-1,2,2-trifluoroethane with gentle stirring. Then six parts (50%) of water were added to this mixture and the mixture was stirred until a clear, amber colored, homogeneous, stable emulsion was obtained. The presence of water in the dispersed phase was demonstrated by immersing two electrodes of an electrical circuit containing a current measuring device into the emulsion. No current flow was registered; if water had been the continuous phase, a current flow would have been registered.

*Example 2*

Forty-two parts (42%) isopropylammonium dodecylbenzenesulfonate were added to 37 parts (37%) 1,1,2-trichloro-1,2,2-trifluoroethane with agitation. Then 21 parts of concentrated ammonium hydroxide were added to the solution and the resulting mixture was agitated, giving a clear, homogeneous, stable emulsion which contained approximately 6% by weight ammonia.

*Example 3*

To illustrate the rapidity of the cleaning action visually, using the emulsions of this invention, glass microscope slides were smudged with fingerprints and the like. One group of slides was then treated by immersion for about 90 seconds in an ultrasonically agitated solution consisting of 1% isopropylammonium dodecylbenzenesulfonate, 1% water and 98% 1,1,2-trichloro-1,2,2-trifluoroethane. The other group was treated by immersion for about 90 seconds in an ultrasonically agitated emulsion consisting of 1% isopropylammonium dodecylbenzenesulfonate, 0.75% water and 0.25% concentrated ammonium hydroxide in 1,1,2-trichloro-1,2,2-trifluoroethane. Both sets of slides were then dipped in 1,1,2-trichloro-1,2,2-trifluoroethane and then exposed to the vapors of 1,1,2-trichloro-1,2,2-trifluoroethane. The slides dried within one minute. Both sets of slides were found to be completely free of smudges.

*Example 4*

Used typewriters in the process of being reconditioned were found to be soiled with corrosion products, dried oil, dried ink, grease and the like resulting from long use. One group of such typewriters was immersed in an ultrasonically agitated bath containing an emulsion consisting of 2% isopropylammonium dodecylbenzenesulfonate, 6% water and 92% 1,1,2-trichloro-1,2,2-trifluoroethane. Another group of such typewriters was immersed in a similar bath containing an emulsion consisting of 0.05% ammonia, 6% water, 2.5% isopropylammonium dodecylbenzenesulfonate and the remainder 1,1,2-trichloro-1,2,2-trifluoroethane. Both sets of typewriters were agitated for approximately five minutes. Then each set of typewriters was rinsed with 1,1,2-trichloro-1,2,2-trifluoroethane and allowed to dry. Both sets of typewriters were found to be free of most corrosion products, dried oil, ink, grease and other soils. The set treated with the ammonia containing emulsion was found to be free of surface stains, hence essentially clean. The set treated with the ammonia free emulsion still contained a few metal stains but was clean otherwise. Both sets showed no sign of attack by the cleaning solution on rubber, plastic and other parts and there were no signs of attack on surface finishes and the like.

In drying or rinsing steps, time is not critical. The only requirement is that the machine or machine part be completely contacted by the chlorofluorocarbon or the solution or emulsion containing it.

As many apparently widely different embodiments of this invention may be made without departing from the spirit and scope thereof, it is to be understood that this invention is not limited to the specific embodiments thereof except as defined in the appended claims.

What is claimed is:

1. A stable water-in-oil emulsion consisting essentially of from about 0.25% to about 50% by weight water, from about 0.1% to about 45% by weight isopropylammonium dodecylbenzenesulfonate and at least about 30% by weight 1,1,2-trichloro-1,2,2-trifluoroethane.

2. A stable water-in-oil emulsion consisting essentially of from about 0.25% to about 40% by weight water, from about 0.1% to about 45% by weight isopropylammonium dodecylbenzenesulfonate, from about 0.01% to about 8% by weight ammonia and at least about 30% by weight 1,1,2-trichloro-1,2,2-trifluoroethane.

3. A stable water-in-oil emulsion consisting essentially of about 2% by weight isopropylammonium dodecylbenzenesulfonate, about 6% by weight water and about 92% by weight 1,1,2-trichloro-1,2,2-trifluoroethane.

4. A stable water-in-oil emulsion consisting essentially of about 1% by weight isopropylammonium dodecylbenzenesulfonate, about 0.75% by weight water and about 98% by weight 1,1,2-trichloro-1,2,2-trifluoroethane and about 0.25% by weight of concentrated aqueous ammonia.

5. A stable water-in-oil emulsion consisting essentially of about 2.5% by weight isopropylammonium dodecylbenzenesulfonate, about 6% by weight water and about 91.5% by weight 1,1,2-trichloro-1,2,2-trifluoroethane and about 0.05% by weight of ammonia.

6. A stable water-in-oil emulsion consisting essentially of about 16.7% by weight isopropylammonium dodecylbenzenesulfonate, about 33.3% by weight 1,1,2-trichloro-1,2,2-trifluoroethane and about 50% by weight water.

7. A process for cleaning machinery which comprises contacting said machinery with a stable water-in-oil emulsion consisting essentially of from about 0.25% to about 50% by weight water, from about 0.1% to about 45% by weight isopropylammonium dodecylbenzenesulfonate and at least about 30% by weight 1,1,2-trichloro-1,2,2-trifluoroethane for a period of time sufficient to remove adhering soils and corrosion products.

8. A process for cleaning machinery which comprises immersing said machinery in a stable water-in-oil emulsion consisting essentially of from about 0.25% to about 40% by weight water, from about 0.1% to about 45% by weight isopropylammonium dodecylbenzenesulfonate, from about 0.01% to about 8% by weight ammonia and at least about 30% by weight 1,1,2-trichloro-1,2,2-trifluoroethane and agitating said emulsion in contact with the machinery by ultrasonic vibrations and maintaining the emulsion in contact with the machinery for a period of time sufficient to remove adhering soils, corrosion products and stains.

9. A process for cleaning machinery which comprises contacting said machinery with a stable water-in-oil emulsion consisting essentially of from about 0.25% to about 50% by weight water, from about 0.1% to about 45% by weight isopropylammonium dodecylbenzenesulfonate and at least about 30% by weight 1,1,2-trichloro-1,2,2-trifluoroethane for a period of time sufficient to remove adhering soils and corrosion products and removing the machinery from contact with the emulsion and rinsing the machinery by contacting the machinery with 1,1,2-trichloro-1,2,2-trifluoroethane.

10. A process for cleaning machinery which comprises contacting said machinery with a stable water-in-oil emulsion consisting essentially of from about 0.25% to about 50% by weight water, from about 0.1% to about 45% by weight isopropylammonium dodecylbenzenesulfonate and at least about 30% by weight 1,1,2-trichloro-1,2,2-trifluoroethane for a period of time sufficient to remove any contaminants from said machinery, allowing an aqueous phase containing said contaminants to separate from the emulsion, removing said separated aqueous phase, and thereafter adding to the emulsion an amount of fresh water sufficient to return said emulsion to the strength desired for continued cleaning.

11. A process for cleaning machinery which comprises contacting said machinery with a stable water-in-oil emulsion consisting essentially of from about 0.25% to about 40% by weight water, from about 0.1% to about 45% by weight isopropylammonium dodecylbenzene sulfonate, from about 0.01% to about 8% by weight ammonia and at least about 30% by weight 1,1,2-trichloro-1,2,2-trifluoroethane for a period of time sufficient to remove any contaminants from said machinery, allowing an aqueous phase containing said contaminants to separate from the emulsion, removing said separated aqueous phase, and thereafter adding an amount of water and ammonia sufficient to return said emulsion to the strength desired for continued cleaning.

12. A process for cleaning machinery which comprises contacting said machinery with a stable water-in-oil emulsion consisting essentially of from about 0.25% to about 50% by weight water, from about 0.1% to about 45% by weight isopropylammonium dodecylbenzenesulfonate and at least about 30% by weight 1,1,2-trichloro-1,2,2-trifluoroethane for a period of time sufficient to remove any contaminants from said machinery, allowing an aqueous phase to separate from said emulsion, said aqueous phase containing a major amount of the water soluble contaminant materials removed from said machinery and a minor amount of isopropylammonium dodecylbenzenesulfonate, removing said separated aqueous phase, and thereafter adding to the emulsion an amount of fresh water sufficient to return said emulsion to the strength desired for continued cleaning.

13. A process for cleaning machinery which comprises contacting said machinery with a stable water-in-oil emulsion consisting essentially of from about 0.25% to about 40% by weight water, from about 0.1% to about 45% by weight isopropylammonium dodecylbenzenesulfonate, from about 0.01% to about 8% by weight ammonia and at least about 30% by weight 1,1,2-trichloro-1,2,2-trifluoroethane for a period of time sufficient to remove any contaminants from said machinery, allowing an aqueous phase to separate from said emulsion, said aqueous phase containing a major amount of the water soluble contaminant materials removed from said machinery, ammonia, and a minor amount of isopropylammonium dodecylbenzenesulfonate, removing said separated aqueous phase, and thereafter adding an amount of water and ammonia sufficient to return said emulsion to the strength desired for continued cleaning.

(References on following page)

References Cited

UNITED STATES PATENTS

| | | | |
|---|---|---|---|
| 2,748,084 | 5/1956 | De Lew et al. | 252—172 |
| 2,941,952 | 6/1960 | Lewis et al. | 252—171 XR |
| 3,001,947 | 9/1961 | Stahler et al. | 252—153 XR |
| 3,042,479 | 7/1962 | Hicks et al. | 252—171 XR |
| 3,090,818 | 5/1963 | Long | 252—171 XR |
| 3,167,514 | 1/1965 | Baker | 252—171 XR |

FOREIGN PATENTS 582,455  9/1959  Canada.

OTHER REFERENCES

Detergents and Emulsifiers (1963 Annual), McCutcheon, Inc., Morristown, N.J. (p. 55 relied on.)

LEON D. ROSDOL, *Primary Examiner.*

JULIUS GREENWALD, *Examiner.*

J. T. FEDIGAN, *Assistant Examiner.*